United States Patent [19]

Vanvoren

[11] Patent Number: 4,770,826

[45] Date of Patent: Sep. 13, 1988

[54] METHOD OF REGULATING THE TAR CONTENT OF ANODES INTENDED FOR THE PRODUCTION OF ALUMINUM BY ELECTROLYSIS

[75] Inventor: Claude Vanvoren, St. Jean de Maurienne, France

[73] Assignee: Aluminum Pechiney, Paris, France

[21] Appl. No.: 63,304

[22] Filed: Jun. 17, 1987

[30] Foreign Application Priority Data

Jun. 24, 1986 [FR] France .................. 86 09805

[51] Int. Cl.$^4$ .................. B28C 7/04; C25C 3/06; C25B 11/12; H05B 7/214
[52] U.S. Cl. .................. 264/40.4; 204/67; 204/294; 264/40.1; 264/109; 373/88; 373/89
[58] Field of Search .................. 204/67, 294; 264/109, 264/40.1, 40.4; 373/88, 89

[56] References Cited

U.S. PATENT DOCUMENTS

| | | | |
|---|---|---|---|
| 3,284,334 | 11/1966 | Metrailer et al. | 204/67 |
| 4,133,090 | 1/1979 | Peterson | 106/284 |
| 4,244,897 | 1/1981 | Moon | 264/40.4 |

Primary Examiner—John F. Niebling
Assistant Examiner—Kathryn Gorgos
Attorney, Agent, or Firm—Dennison, Meserole, Pollack & Scheiner

[57] ABSTRACT

The invention relates to a method of regulating the tar content of precooked anodes intended for the production of aluminum by electrolysis, to an optimum level Bm corresponding to the maximum dry density of the anodes, which utilizes measurements on crude anodes emerging from compaction and without awaiting the results of the cooking process. The method comprises the following repeatedly carrying out of the following sequence of steps:

(a) forming a carbonaceous paste containing, by weight, an initial tar content Bo %;
(b) forming a number n of anodes from the initial carbonaceous paste, and determining mean dry density by measuring their height H and weight P when they emerge from compaction;
(c) forming a further carbonaceous paste containing tar content, $\gamma(Bo+x_o)$ % where $x_o$ is greater or less than zero;
(d) forming a number m of anodes from the second carbonaceous paste and determining the mean dry density $\gamma(Bo+x_o)$ of the m anodes when they emerge from compaction;
(e) comparing $\gamma(Bo+x_o)$ with $\gamma(Bo)$, and regulating the tar content of the carbonaceous paste such that:
if $\gamma(Bo+x_o) > \gamma(Bo)$, then $Bo+x_o$ is changed by a value $x=x_o$, of the same sign as the preceding increment. If $\gamma(Bo+x_o)$ is $<\gamma(Bo)$, then $Bo+x_o$ is changed by a value $x=(-x_o)$.

9 Claims, 2 Drawing Sheets

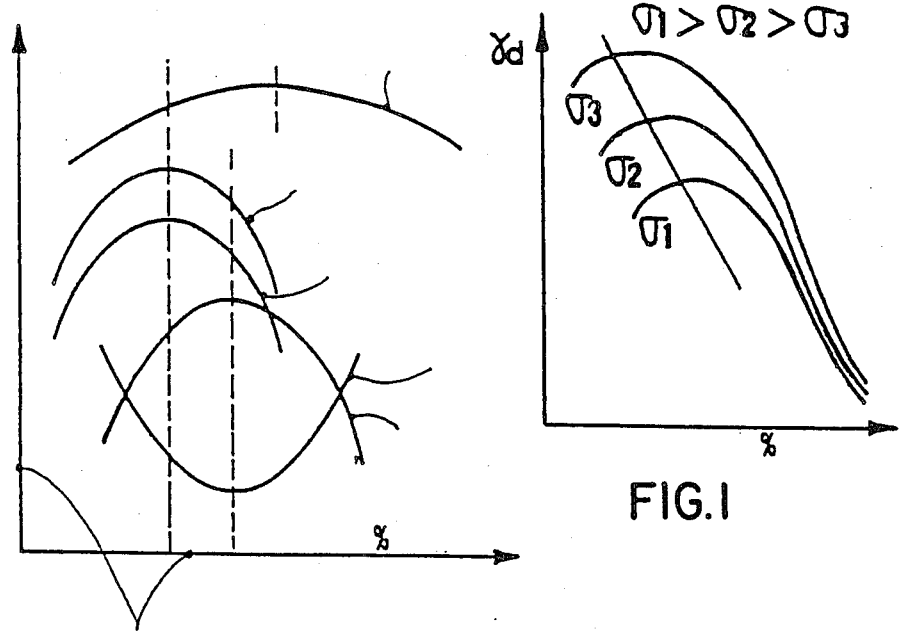
FIG.1
FIG.2
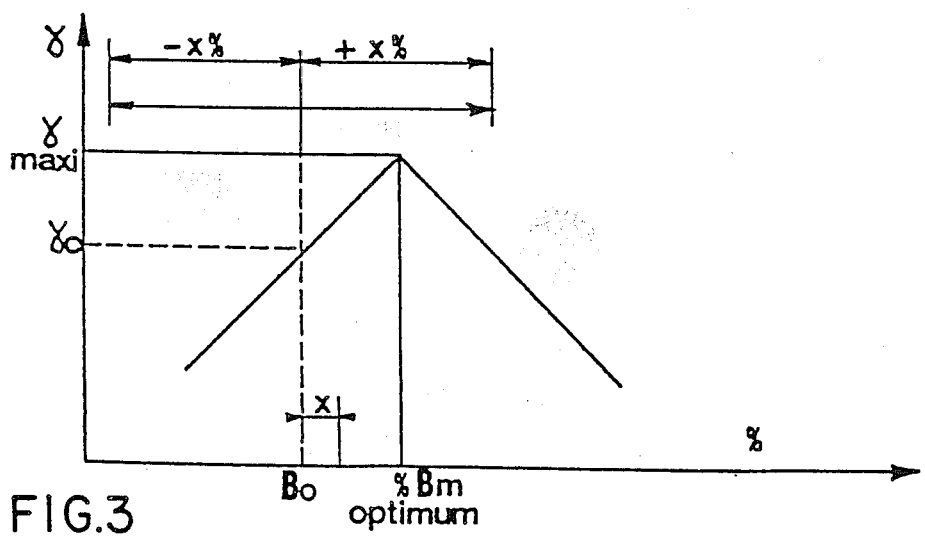
FIG.3

METHOD OF REGULATING THE TAR CONTENT OF ANODES INTENDED FOR THE PRODUCTION OF ALUMINUM BY ELECTROLYSIS

The invention relates to a method of regulating the tar content of anodes intended for the production of aluminium by electrolysis, by the Hall-Heroult process.

STATEMENT OF THE PROBLEM

So-called "precooked" anodes are obtained by the hot mixing of an aggregate (more often than not coke) and a binder (more often than not tar) shaping of the resultant carbonaceous paste by vibro-consolidation, pressing or vibro-pressing and cooking at an elevated temperature (1100°/1200° C.).

The quality of the anodes has a vital influence on the satisfactory conduct and energy efficiency of electrolysis and one of the continual worries of operators is that of optimising the production of the anodes which is, inter alia, translated into seeking a maximum density in the cooked product. The main concern is to increase the duration of the anode cycle in relation to the electrolysis tank and diminution of the number of blocks to be produced for an equivalent carbon consumption.

The density of the cooked product is essentially a function of three parameters: the dry density of the crude product, the coking efficiency of the binder and the volumetric variations which arise during the course of cooking.

These three parameters are not independent and vary as a function of the binder content in the crude product.

Experience shows that for a given pairing of the raw materials (coke, tar), manufacturing conditions (granulation, mixing, etc. . . . ) and shaping of the paste, the cooked density curve as a function of the binder content passes through a maximum for the content which makes it possible to obtain maximum dry density in the crude product.

THEORETICAL BASIS OF THE PROBLEM

The study of the structure of carbonaceous anodes has been greatly influenced by soil mechanics.

In the mechanics of polyphasic media, it is well known that the compaction of a soil with a variable water content produces a dry density curve which has a maximum, the dry density possibly being defined as the density of the dry matter in the compacted medium.

When the compaction stress increases (static or dynamic stress), the density maximum rises at the same time as the corresponding water content decreases.

This result is interpreted by the notion of saturated water content, the content beyond which, for a given stress, the level of density diminishes by reason of the grains of the solid matrix being moved apart by the liquid.

On the whole, the curves obtained by varying the compaction stress all fall within an envelope curve referred to as the saturation curve which, for a given water content, defines the maximum density likely to be attained (SUBBARAO, Doctorate Thesis, Grenoble 1972, "Continuous compaction and mechanics of media").

APPLICATION TO CARBONACEOUS PASTES

The compaction of carbonaceous products can be treated by analogy with soils insofar as they likewise exhibit:

a gaseous medium: air
a liquid medium: the carbonaceous binder (tar, resins, pitch)
a solid medium: the carbonaceous matrix (petrol coke, tar coke, anthracite . . . ).

However, a major difference resides in the porous structure of the solid aggregate.

Accessibility to this porosity varies indeed as a function of the compacting stress. A consequence of this phenomenom is the disappearance of the unicity in the saturation curve. To sum up, for a given tar content, an increase in the compaction stress can improve the saturation density of the product but this phenomenon is, however, subordinate to the effect of the level of binder.

DISADVANTAGES OF THE PRIOR ART

More often than not, the prior art sought to achieve maximum density in the crude compacted anode. Since this method of adjustment leads to a regular increase in the level of tar, this evolution was tempered either by the visual aspect of the anodes leaving the compaction unit (fatty appearance), or an a priori given range of tar content (beyond this range, everyone knew that there would be "sticking" among the anodes in the cooking furnace).

Certain methods of regulation were, however, suggested. This is the case in the ALCOA patent (FR 2 436 763=U.S. Pat. No. 4,133,090) which operates by way of breaking up the crude anode in the moments following emergence from the compaction mould. Then the tar content is regulated to minimise or optimise the break-up according to the density of the anode. This means that such optimisation, after a change in production parameters (raw materials, granulation, etc. . . . ) cannot be applied readily until there is full knowledge of the characteristics of the cooked anode, that is to say after a response time of several days, which is not compatible with the production of crude anodes. In practice, then, one is compelled to look for an average breakdown which guarantees that one will not be especialy remote from an optimum result.

SUMMARY OF THE INVENTION

The object of the invention is a method of regulating the manufacture of the crude anode (by working on the tar content), which makes it possible to maximise the density of the cooked anode without having to await the results of the cooking process.

For a given and constant level of petrol coke quality, the apparent cooked density of the anode then depends essentially on the dry density of the crude anode. This directly translates the effective compaction of the dry matter in the anode.

This dry density is linked to the crude apparent density of the anode and the tar content by the equation:

$$DS = \text{crude } DA \times (100 - \% \text{ tar})/100$$

in which: $DS$=the dry density of the crude anode, crude $DA$ is the apparent density of the crude anode (as is measured directly), % tar=the tar content expressed as a percentage by weight of the paste.

For a given pairing of raw materials and for given production conditions (granulation, mixing . . . ) and shaping of the paste, the dry density of the crude anodes obtained passes through an optimum for a certain tar content.

In a simplified view, using arbitrary scales, FIGS. 1 to 3 show how the characteristics of the anodes develop according to the tar content.

BRIEF DESCRIPTION OF THE DRAWINGS

FIG. 1 shows the variation in dry density of the crude anode as a function of the binder content with, as a parameter, the stress exerted at the time of shaping;

FIG. 2 shows the variation in the principal parameters of anodes according to the tar content for a given level of compaction stress;

FIG. 3 is a diagrammatic representation of the principle of the method of regulating the tar content according to the invention.

DESCRIPTION OF THE PREFERRED EMBODIMENTS

Figure 4:
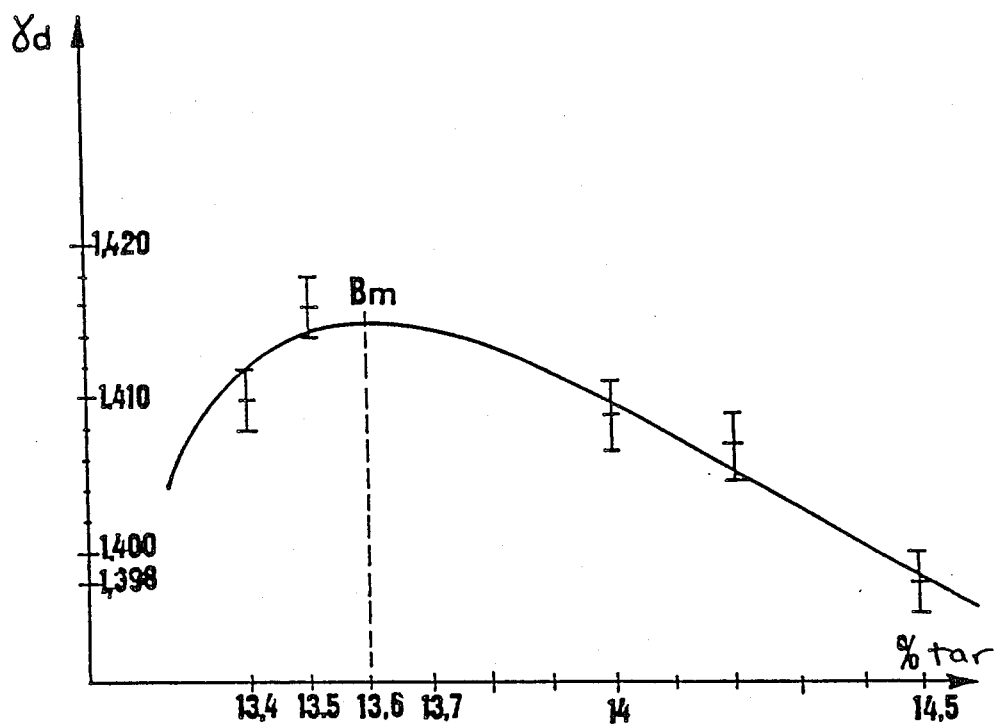
FIG. 4 is the practical application of the invention.

The optimum tar content which makes it possible to obtain the maximum apparent cooked density appears in FIG. 2. It will be seen to correspond to that which makes it possible to obtain maximum dry density in the crude anode. This method, which is the object of the invention, therefore makes it possible to optimise the apparent cooked density of the anodes by only taking into account measurements carried out on crude anodes emerging from the compaction stage and therefore, immediately available for piloting the system of control.

Furthermore, this optimum dry density is relative and obviously varies with the production parameters (raw materials, granulation ...). Therefore, with the exception of transition periods, optimisation of the dry density will in all cases lead to optimisation of the cooked density.

This process, which is the object of the invention, comprises the following succession of operations:

The carbonaceous paste mixer is supplied:
on the one hand with crushed coke of predetermined granulation which is maintained constant, the rate of coke supply likewise being maintained constant;
on the other, tar of which the $B_o\%$ content in relation to the coke is regulable either manually via the operator or by an automatic unit which is programmable or operated by microprocessor.

On leaving the mixer, the carbonaceous paste is introduced into the compactor and the compacted anodes are discharged onto a roller table.

If a discontinuous mixer is used, a batch of carbonaceous paste is of constant composition. Any change in the amount of tar will, therefore, have its repercussions on the whole batch of N anodes produced from the batch. If the mixer is of the continuous type, there is is an offset between the moment when the tar content is modified at the head of the mixer and that at which the first compacted anode appears and has been produced from the paste which is of modified composition. This offset is called "d" (in practice, it may represent 3 to 6 anodes). The calculator is then programmed to take this into account.

The apparent density of the crude anode is established on a basis of the weight and volume of the anode.

The weight is measured with a margin of error of less than 0.1%. Experience shows that the dimensions length and width, after compaction, can be considered as constant with similar precision for tar contents which do not diverge by more than 1% (absolute) from the mean value. It is therefore sufficient to measure the height H of the compacted anode in order to know its volume. One feeds into the calculator: the measured weight, the length and width (constant but open to correction if necessary), and the measured height along with the level of tar content.

The result therfore is: crude $DA$ = weight of the anode $P/[(H-h_o) \times L \times 1] + V_o$, $V_o$ being the volume of the "head" of the anode, that is to say the top part which has the chamfers, the anode plugs and any various tapers, $h_o$ being the height of the anode head. Dry density of the crude anode: $DS$ = crude $DA \times (100-\%\text{tar})/100$. These data are fed into a calculator.

The calculator likewise takes into account an initial tar content $B_o\%$ which is fixed according to production experience; the anodes produced under these conditions have a dry density which is referred to as $\gamma(B_o)$.

Then:

1. The initial tar content $B_o$ is raised by a value $x_o$ (for example: 0.1 or 0.2% absolute). The anodes produced with this new tar content $B_o + x_o$ have a dry density $\gamma(B_o + x_o)$ which is measured as an average over n anodes (for example 5 to 20 and preferably 10) in order to allow for small fluctuations.

The increment x may be positive or negative.

2. $\gamma(B_o + x_o)$ is compared with $\gamma(B_o)$ (mean values). If $\gamma(B_o + x_o) > \gamma(B_o)$, $B_o + x_o$ is increased by a value x of the same sign as the previous value ($x = x_o$). If $\gamma(B_o + x_o) < \gamma(B_o)$, $B_o + x_o$ is increased by a value of x but of a sign opposite that of the previous value, ($x = (-x_o)$), and so on, each stage in the process residing in comparing the density level obtained at the stage in question with the level obtained in the preceding stage.

This algorithm can be justified by observing that if the increase in $B_o$ (positive increment x) results in an increase in the dry density of the anodes, this shows that one is below the optimum $B_m$, while if this increase in $B_o$ leads to a reduction in the dry density, then one will in all probability have exceeded the optimum $B_m$.

In the same way, if a diminution in $B_o$ (a negative increment x) leads to a diminution in the dry density, this shows that one is quite probably below the optimum content $B_m$, while if this diminution of $B_o$ leads to an increase in the dry density, one must be above the optimum $B_m$.

3. If any one of the comparisons between $\gamma(B_o + nx_o)$ and $(B_o + (n+1)x_o)$ results in equality, then it is possible to give an instruction to the operator or to the automatic unit:

either to maintain the tar content unchanged at the level $B_o + (n+1)x_o$;
or to change to $[B_o + (n+1)x_o] + x'$, with $x'$ positive or negative, this operation possibly being carried out with an increment $x'$ equal to $x_o$ or less than $x_o$ (for example $x' = x/2$) so as not to diverge too greatly from the optimum $B_m$ if it is considered that one is now in the vicinity of this value.

4. A maximum limit is set for the variations in $B_o$. This limit, $B_o \pm X$ (FIG. 3) can be fixed at n increments of $x_o$. Each of these steps may, for example, be of 0.1 or 0.2% tar (in relation to absolute %) and X may be fixed, for example, at $\pm 0.5$ or $\pm 0.6\%$ (absolute).

5. Likewise, to avoid excessively wide fluctations around the optimum value $B_m$, it is possible after a certain settling down time to rescale the initial value $B_o$ of tar content and give it a new value equal to substantially equal to the optimum value $B_m$, as may be deduced from the true curve of fluctuation of dry density according to the tar content which appears in FIG. 4 and which the calculator can automatically establish.

As has been previously indicated, all these operations may be carried out:

either manually: in this case, the operator reads off the data provided by the calculator and proceeds to make increments in x in the direction indicated and within the limits fixed for the total fluctuations of $X=\Sigma x_o$;

or automatically, the data from the calculation being fed into a programmable or microprocessor controlled automatic unit which provides a display and/or facility for editing the evolution of the various parameters.

Traced in FIG. 4 is an experimental curve showing the full range from 13.4 to 14.5% in relation to tar content.

It will be observed that for every value of tar content, the measured values for dry density are regrouped on a dispersion line of an amplitude of approx. +0.002 points of absolute value of dry density.

EXAMPLE OF EMBODIMENT

In a line producing anodes intended for a series of electrolysis tanks, Bo is fixed at 13.4% tar, $x_o$ at 0.1% and X at ±0.6%. It has been found that the regulator was optimising the tar content at around 13.6%, corresponding to a maximum density (dry density) of 1.416, in other words a crude density of 1.638, an exceptionally high level which provides cooked anodes of a very high level of quality.

Application of the invention is not confined to the production of anodes: any carbonaceous block obtained by the shaping of carbonaceous paste by vibro-consolidation, ramming or pressing or vibro-pressing can be obtained with a maximum dry density by regulating the tar content according to the invention.

What is claimed is:

1. In a method for the production of precooked anodes for the production of aluminum by electrolysis comprising hot mixing a crushed carbon aggregate and a coking tar in regulable proportions to form a carbonaceous paste, shaping the paste by compaction, and cooking the shaped paste at an elevated temperature, the improvement comprising a method for regulating the tar content of said anodes to an optimum value Bm corresponding to the maximum dry density of the anodes, comprising repeatedly carrying out the sequence of steps:

(a) forming an initial carbonaceous paste containing, by weight, an initial tar content Bo%;

(b) forming a number n of anodes from said initial carbonaceous paste, and determining the mean dry density $\gamma(Bo)$ of said n anodes by measuring height H and weight P of the n anodes as they emerge from the compaction step;

(c) forming a further carbonaceous paste containing a further tar content $(Bo+x_o)\%$, where $x_o$ is greater or less than zero;

(d) forming a number m of anodes from said further carbonaceous paste, and determining the mean dry density $\gamma(Bo+x_o)$ of the m anodes as they emerge from the compaction step;

(e) comparing $\gamma(Bo+x_o)$ with $\gamma(Bo)$; and (f) regulating the tar content of the carbonaceous paste such that:

if $\gamma(Bo+x_o) > \gamma(Bo)$, changing the tar content of said carbonaceous paste by the value $x=x_o$, and if $\gamma(Bo+x_o) < \gamma(Bo)$, changing the tar content of said second carbonaceous paste by the value $x=(-x_o)$.

2. Method according to claim 1, wherein $\gamma(Bo+x_o)=\gamma(Bo)$ for one sequence of steps, and the tar content of the carbonaceous paste is not changed.

3. Method according to claim 1, wherein $\gamma(Bo+x_o)=\gamma(Bo)$ for one sequence of steps, and the tar content of the carbonaceous paste is changed by a value $x'$, where $|x'|<|x_o|$.

4. Method according to claim 1, wherein a limit $|X|$ is set for the maximum change in tar content.

5. Method according to claim 1, 2, 3 or 4, additionally comprising plotting a curve of mean dry density versus tar content, and determining the optimum tar content Bm corresponding to the maximum mean dry density.

6. Method according to claim 5, additionally comprising, after a settling down period, resetting Bo to Bm, and repeating said sequence of steps.

7. Method according to claim 4, wherein $x_o$ is between about 0.1 and 0.2%, and $|X|$ is about 0.6%.

8. Method according to claim 4, wherein parameters Bo, $\gamma(Bo)$, $\gamma(Bo+x_o)$, H, P, $|X|$, and $x_o$ are fed to a calculator which determines whether tar content is to be increased or decreased at the conclusion of a sequence of steps.

9. Method according to claim 8, wherein the calculated output is connected to a means which automatically changes tar content.

* * * * *